United States Patent [19]

Enderle et al.

[11] Patent Number: 5,028,901
[45] Date of Patent: Jul. 2, 1991

[54] MAGAZINE FOR COORDINATE MEASURING APPARATUS

[75] Inventors: Eckhard Enderle, Aalen-Dewangen; Dieter Kaufmann, Heidenheim, both of Fed. Rep. of Germany

[73] Assignee: Carl-Zeiss Stiftung, Heidenheim, Fed. Rep. of Germany

[21] Appl. No.: 550,028

[22] Filed: Jul. 9, 1990

[30] Foreign Application Priority Data

Jul. 7, 1989 [DE] Fed. Rep. of Germany ....... 3922296

[51] Int. Cl.$^5$ .............................................. H01F 7/04
[52] U.S. Cl. ..................................... 335/295; 33/561; 29/568
[58] Field of Search ............... 335/288, 289, 290, 295, 335/229, 230; 33/561; 79/568

[56] References Cited

U.S. PATENT DOCUMENTS 4,637,119 1/1987 Schneider et al. .............. 335/295 X
4,649,623 3/1987 Schneider et al. ..................... 29/568

OTHER PUBLICATIONS

"Automatischer Tasterwechsel des Leitz–SIRIO 688" of Ernest Leitz Wetzlar GmbH, Geschäftseinheit Industrielle Messtechnik.
"Messautomat SIRIO 688" of Ernst Leitz Wetzlar GmbH, Geschäftseinheit Industrielle Messtechnik.
"Rundtakttisch für Messautomat Leitz–SIRIO 688" of Ernst Leitz Wetzlar GmbH, Geschäftseinheit Industrielle Messtechnik.

Primary Examiner—George Harris
Attorney, Agent, or Firm—Walter Ottesen

[57] ABSTRACT

The invention is directed to a magazine for an apparatus such as a coordinate measuring apparatus. Measuring probes are held in their magazine locations by magnetic forces. Each magazine location is provided with one or more permanent magnets. The holding force of the permanent magnets is neutralized by an individual electromagnet on that magazine location which is involved in an exchange operation. In this way, the measuring probe being held can be easily removed. The magazine can also be for an apparatus such as a machine tool in which case work tools are held at the magazine locations.

11 Claims, 3 Drawing Sheets

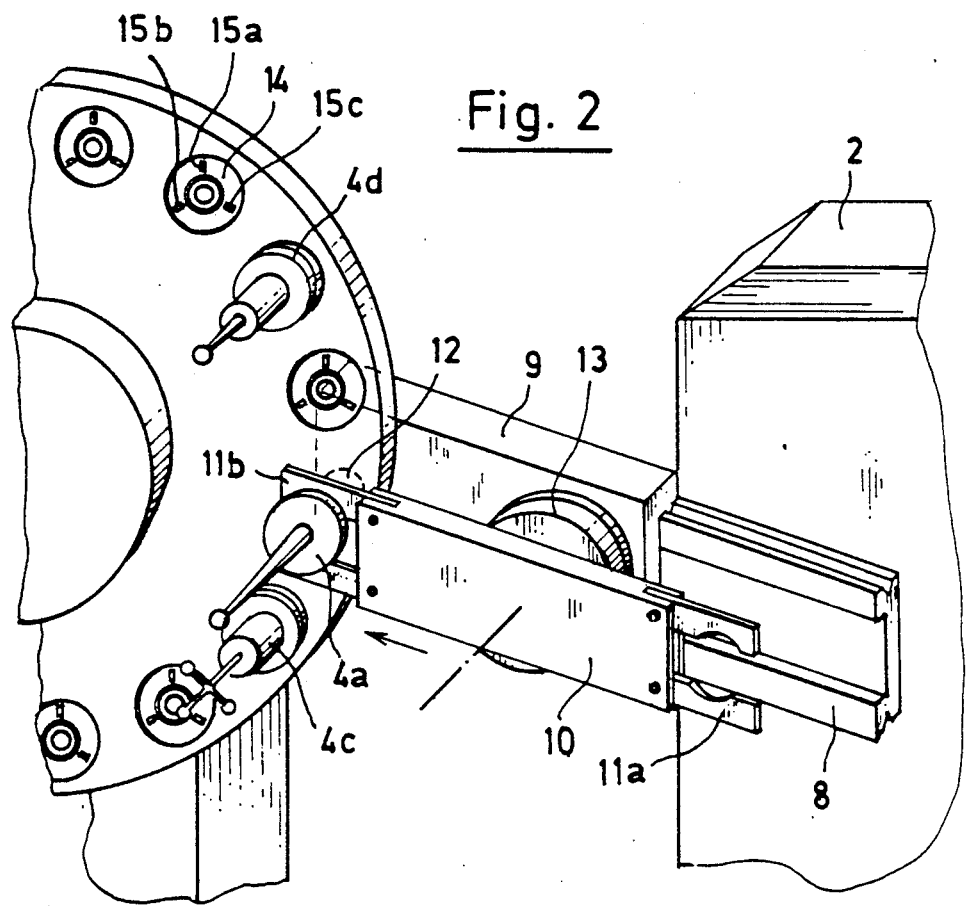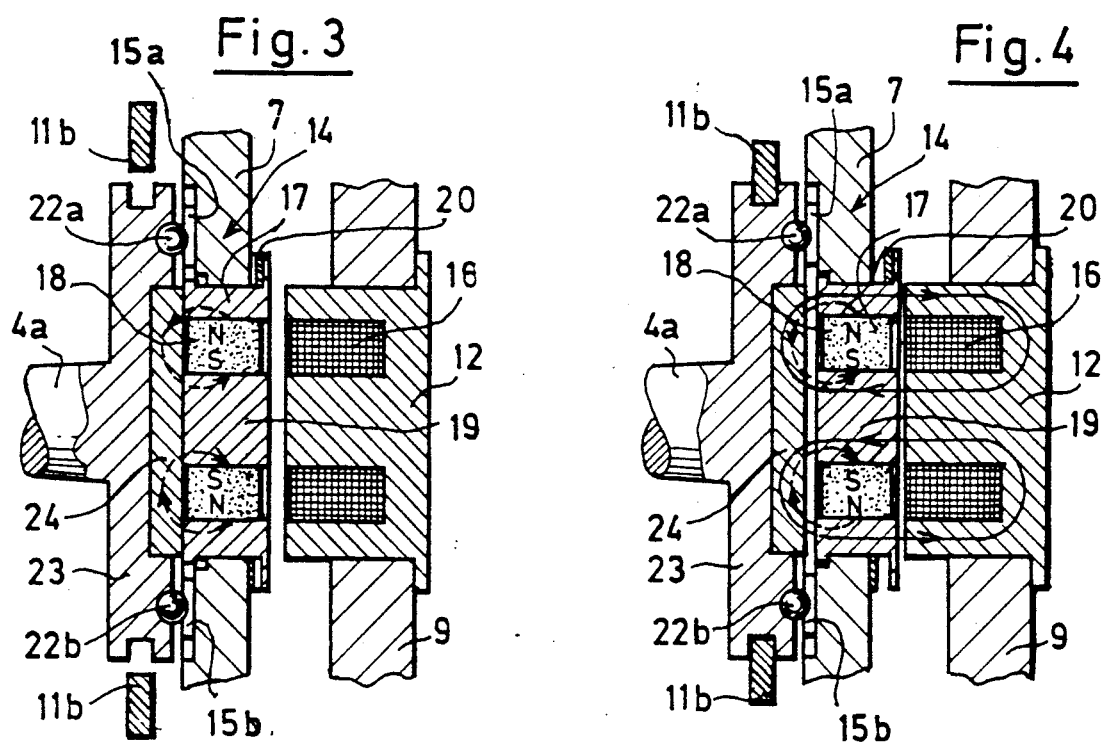

MAGAZINE FOR COORDINATE MEASURING APPARATUS

FIELD OF THE INVENTION

The invention relates to a magazine for an apparatus such as a coordinate measuring apparatus or a machine tool having a plurality of magazine positions for measuring probes or tools which are to be exchanged.

BACKGROUND OF THE INVENTION

A magazine for the measuring probes of coordinate measuring apparatus is disclosed, for example, in U.S. Pat. No. 4,649,623 and especially in FIG. 5 thereof. In this magazine, the measuring probes to be exchanged hang in the bifurcated cutout of a horizontally arranged carrier and are held in this carrier by their own weight. Such horizontal magazines are set up in the measuring area of the coordinate measuring apparatus and are preferably utilized in combination with coordinate measuring apparatus of the portal or extender type since the perpendicularly aligned measuring arm of the apparatus itself can receive the measuring tool to be exchanged without further mechanical parts being interposed. The measuring arm receives the measuring tool while being controlled in a computerized numerically controlled manner (CNC control).

It is known to hold the measuring probes of coordinate measuring apparatus in the same manner as for machine tools in a separate magazine so that they are in ready supply, the magazine being arranged outside of the measuring area. Each measuring probe which is to be exchanged is brought into the transfer position by rotating the magazine from which the gripper takes the measuring tool out of the magazine and guides it to the measuring arm of the coordinate measuring apparatus. The foregoing is described for example in the product brochure entitled "Automatischer Tasterwechsel des Leitz-SIRIO 688" of Wild Leitz GmbH. Especially when the measuring arm of the particular apparatus is horizontally aligned, the measuring probe is often likewise made ready in a horizontal alignment at least at the transfer position. In this case, mechanical holders have to be provided for the magazine positions which reliably hold the measuring probe in its magazine position and prevent the same from falling out therefrom. These mechanical holding means more or less prevent removal of the measuring probe out of the magazine.

The above-mentioned U.S. Pat. No. 4,649,623 furthermore discloses holding the probe pin combinations to be exchanged in the probe head of a coordinate measuring apparatus by means of magnetic forces, that is by means of a combined permanent/electromagnet. This solution is practical for the individual probe head of the coordinate measuring apparatus but cannot be simply applied for holding the measuring probe in a magazine. This situation is present because it is relatively complex to provide approximately twenty magazine positions with such a combined permanent/electromagnet and to wire the same.

SUMMARY OF THE INVENTION

It is an object of the invention to provide a magazine of the kind described above with the least amount of complexity so that the measuring probe or tool can be reliably held in horizontal alignment and can be easily removed.

The magazine of the invention is for an apparatus interchangeably utilizing a plurality of task units which are stored in the magazine until transferred into o out of the magazine as needed, each of the task units being adapted to be held by a magnetic force. The magazine includes: a member defining a plurality of magazine locations arranged thereon for accommodating corresponding ones of the task units therein for use by the apparatus; each of the magazine locations including permanent magnetic means having a permanent magnetic field for acting on the task unit stored at the one magazine location with a magnetic holding force for holding the task unit in the magazine location; and, electromagnet means for superposing an electromagnetic field on the permanent magnetic field at the particular magazine location whereat a transfer operation takes place so as to strengthen or weaken the permanent magnetic field depending upon whether the task unit is transferred into or out of the particular magazine location.

The apparatus can be a coordinate measuring apparatus for which the task units would be a plurality of measuring probes. On the other hand, the apparatus can be a machine tool in which case the task units would be a plurality of work tools.

The magazine according to the invention provides that the measuring probes or tools are held in their magazine locations with the aid of magnetic forces with one or a plurality of permanent magnets being provided for each magazine location. A single electromagnet is provided having a field which can be superposed upon the field of the permanent magnet at the magazine location involved in the transfer or exchange operation.

It is unnecessary to provide wiring for the movable magazine wheel because of the separation of the permanent magnet and electromagnet so that each magazine location includes a permanent magnet but with the electromagnet only being associated therewith at the particular exchange location. Furthermore, only a single electromagnet is needed. The required complexity is therefore minimal. The measuring probes or tools can be held in the magazine by the magnets alone because of the axially directed force. Accordingly, mechanical latching mechanisms are avoided and the measuring probes or tools to be exchanged can be very easily removed at the transfer position in that the electromagnet is energized at the transfer position so that its magnetic field neutralizes the magnetic field of the permanent magnet in the particular magazine location.

The permanent magnet or magnets are built into the gap of a soft magnetic guide member at the particular magazine locations so that the magnetic poles are arranged in radial direction. This measure makes it possible to mount the electromagnet needed for neutralizing the field of the permanent magnets behind the magazine plate and on the side thereof which faces away from the measuring tool and yet can transmit a relatively large flux from the electromagnet to the armature of the component to be exchanged.

The permanent magnet can be an annular-shaped radially polarized magnet. However, it is also possible to provide a plurality of axially polarized magnets in radial distribution in the gap of the flux guide member at each of the magazine locations to thereby obtain a higher magnetic field strength. Axially polarized magnets are offered with significantly larger magnetic field strengths compared to their size than radially polarized magnets.

The electromagnet must only be positioned in the transfer position of the magazine during the time of the removal operation and during which time it is energized. For this reason, it is possible to mount the electromagnet together with the gripper arm so as to be movable in a direction toward the exchange position, for example, on a longitudinally guided sled. The gripper arm is used for removing the measuring probe or tool. This solution is especially suitable for the case wherein not only a single exchange position is provided but instead where the gripper arm itself moves toward the various magazine locations on a stationary magazine. In other cases, the electromagnet can be installed so as to be stationary at a single transfer position of the magazine.

BRIEF DESCRIPTION OF THE DRAWINGS

The invention will now be described with reference to the drawings wherein:

FIG. 2 is a perspective schematic of the transfer position of the magazine of FIG. 1 shown in an enlarged scale;

FIG. 3 is a section view taken through a magazine location disposed in the transfer position before or after an exchange operation;

FIG. 4 corresponds to the section view of FIG. 3 taken in the same plane but during an exchange operation;

FIG. 6a is a plan view of a magazine location of a further of the invention; and, FIG. 6b is a section view taken along line VIb-VIb of FIG. 6a.

DESCRIPTION OF THE PREFERRED EMBODIMENTS OF THE INVENTION

Figure 1:
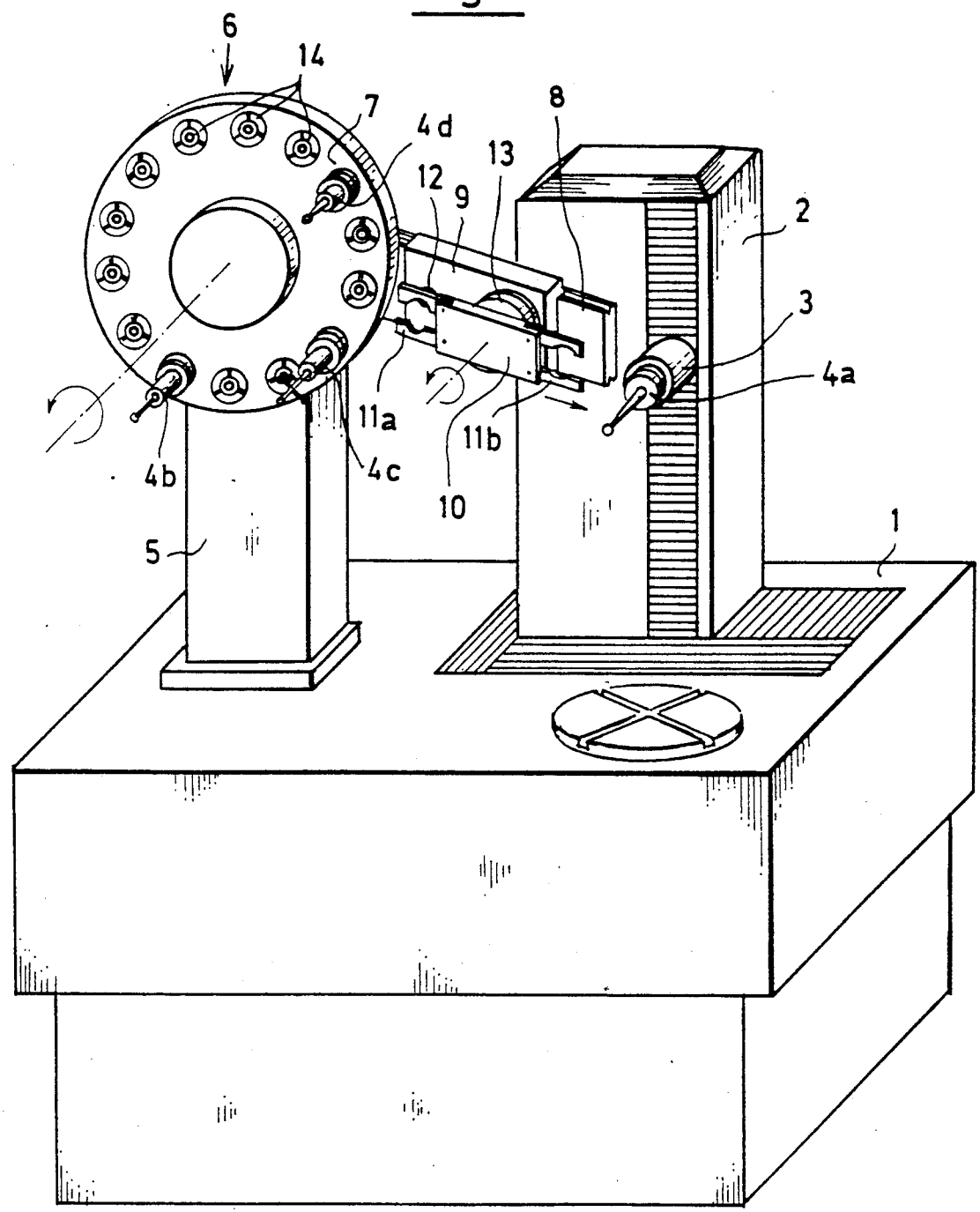
FIG. 1 is a perspective schematic of a coordinate measuring apparatus equipped with a magazine according to the invention.

The coordinate measuring apparatus shown in FIG. 1 includes a machine table identified by reference numeral 1. A stand 2 is shown on the machine table 1 and is displaceably journalled so as to be movable in the two horizontal movement directions X and Y. The probe head 3 of the coordinate measuring apparatus is attached to the stand 2 on a sled displaceable in the perpendicular direction. This probe head 3 carries an exchangeable probe pin 4a.

A magazine 6 for the probe pins to be exchanged is likewise mounted on the machine table 1 outside of the measuring or work area of the apparatus. This magazine has a disc 7 rotatably journalled on a vertical column 5 so as to be rotatable about a horizontal axis. The magazine locations are arranged on the outer periphery of the disc 7. The magazine locations are identified by reference numeral 14 and each includes a three-point bearing in the form of three cylindrical rollers displaced 120° from each other as shown in the enlarged view of FIG. 2. The probe device or probe pin stored at this location is pulled against the cylindrical rollers in a manner which will be described in greater detail below. Such three-point bearings are known per se and are disclosed, for example, in U.S. Pat. No. 4,649,623 referred to above wherein they are described as reproducible exchange bearings for the probe pin in the probe head of a coordinate measuring apparatus.

As shown in FIG. 1, the magazine is loaded with three different measuring probes (4b, 4c, 4d). These measuring probes are horizontally directed in the same manner as the measuring probe 4a on the probe head 3 of the coordinate measuring apparatus and can be exchanged for each other by means of a double gripper 10. For this purpose, the double gripper 10 has two tongs 11a and 11b which can, for example, be actuated by compressed air. The double gripper 10 is pivotable via a rotation bearing 13 through at least 180° and is attached to the sled 9 which can move back and forth between the transfer position in the measuring area of the coordinate measuring apparatus and the exchange location on the magazine via drives (not shown). The guide rail 8 is attached to the column 5 in the same manner as the magazine disc 7.

An electromagnet 12 is also attached to the sled 9 and is mounted behind the tongs 11a and 11b of the double gripper 10. Accordingly, this electromagnet 12 is always disposed behind the magazine location 14 at the exchange position of the magazine 6 when one of the two tongs 11a or 11b of the double gripper 10 accepts or transfers a probing device at this location.

FIGS. 3 and 4 show in detail how the magazine locations 14 are configured and how the probing devices 4a to 4d are held there.

For this purpose, each magazine location 14 is provided with a magnetic holder arranged centrally to the bearing support comprising the three rollers 15a to 15c. This holder comprises a soft-magnetic ring 17 and a soft-magnetic core 19 likewise arranged concentrically thereto with the core 19 having a smaller outer diameter. An annular-shaped permanent magnet 18 is seated in the gap between the two parts 17 and 19 and has a radially polarized field. The flux-conducting part comprising the two soft-magnetic parts 17 and 19 and the permanent magnet 18 conjointly define a component. This component is displaceable against the force of a spring washer 20 on the rearward side of the magazine plate 7 and is axially displaceable through a few 0.10 mm.

An armature 24 is disposed in the exchange plate 23 of the probing device 4a as shown in FIG. 3. When this armature 24 is pulled by the permanent magnet 18 in the position shown in FIG. 3, then the spring washer 20 pulls the exchange plate 23 with its bearing ball pairs (22a, 22b) against the three-point bearing 15a to 15c which is provided at each magazine location.

All other probes are also held in the magazine in this way.

The force of the holding magnet 18 must be overcome for exchanging the probing device. This is not possible by means of a simple mechanical forced removal since the forces required for reliably holding the probing device in the magazine are relatively high and therefore a relatively strong drive would be required for the exchange gripper 10. Also, the danger would then exist that the bearing ball pairs in the exchange plate 23 of the probing device 4a could be damaged.

For this reason, the electromagnet acts to loosen the magnetic holding force with this magnet being moved with the sled 9 to the exchange position behind the magazine location as shown in FIG. 3. This electromagnet comprises a pot-shaped soft-iron part 12 having an E-shape when viewed in cross section. The soft-iron part 12 has an annular gap in which the coil 16 of the magnet is embedded. The annular gap and the coil have the same radial dimensions as the gap or the permanent magnet 18 in the magnet holder at the individual magazine locations.

FIG. 4 shows the situation during an exchange operation when the coil 16 of the electromagnet is excited. In this way, a magnetic flux is induced by the electromagnet into the soft-iron parts 17 and 19 of the magnet holder and this flux is the same as the flux of the permanent magnet 18 at the exchange face but is directly opposed thereto. In this way, the magnetic holding force acting on the armature 24 in the exchange plate 23 of the probing device 4a is caused to vanish and the permanent magnet holder snaps back because of the force of the spring washer 20 and the tong 11b of the double gripper 10 engages the exchange plate 23 at its outer periphery or in an annular slot formed therein so that the probing device 4a can be taken from the magazine location without difficulty.

The double gripper 10 transfers the probing device 4a by means of a combined translational and rotational movement to the probe head 3 of the coordinate measuring apparatus. There, the probing device is likewise held tight by magnetic forces. The corresponding arrangement of the probe head is described in the patent application entitled "Electromagnetic Holding Device" of Eckhard Enderle, Michael Wirth and Bernd Baier filed on the same day herewith Ser. No. 550,029 and is incorporated herein by reference.

Figure 5:
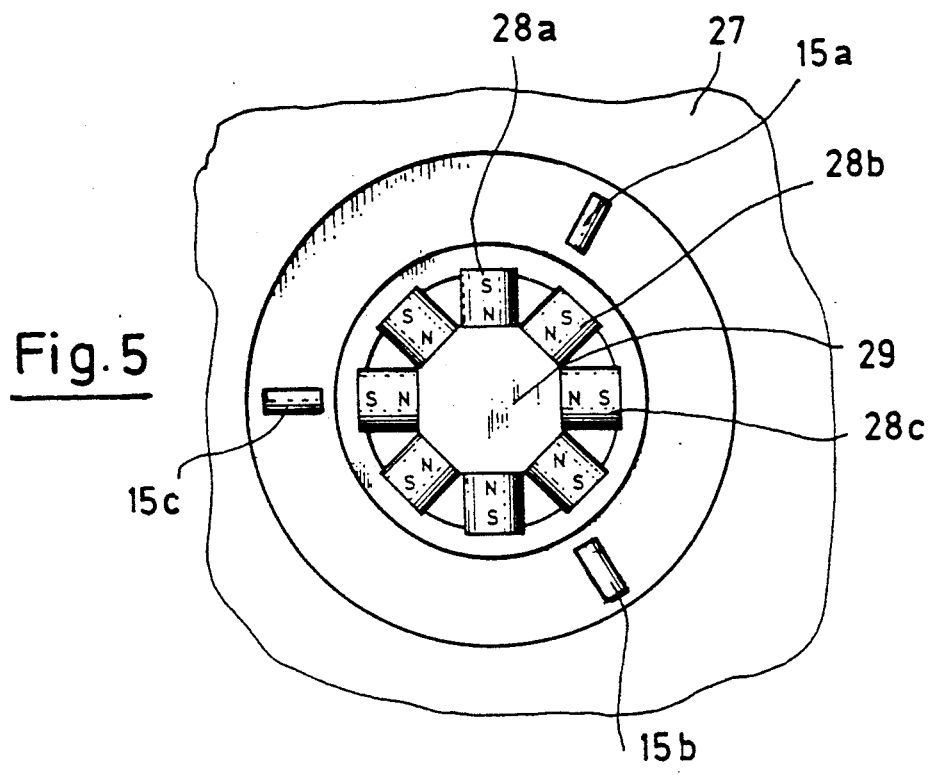
FIG. 5 is a plan view of a magazine location according to an alternate embodiment of the invention.

The annular-shaped permanent magnet 18 having radial polarization of its magnetic field is used in the above-described embodiment. However, it is equally appropriate to build the magnet holder shown in FIG. 5 into the individual magazine locations. This holder has a core 29 having a plurality of corners when viewed in cross section and in the embodiment shown, the core 29 has eight corners. The holder also has a soft magnetic ring 27 which has a corresponding multi-cornered shape within. The soft-magnetic ring 27 and core 29 conjointly define a gap and eight individual permanent magnets 28a to 28h are seated in the gap formed thereby. Although these permanent magnets are axially polarized, a uniform and powerful magnetic flux can be generated by the radial arrangement in the gap with this flux flowing through the armature seated thereon and located in the exchange plate of the probe device or tool to be held.

Figure 6A:
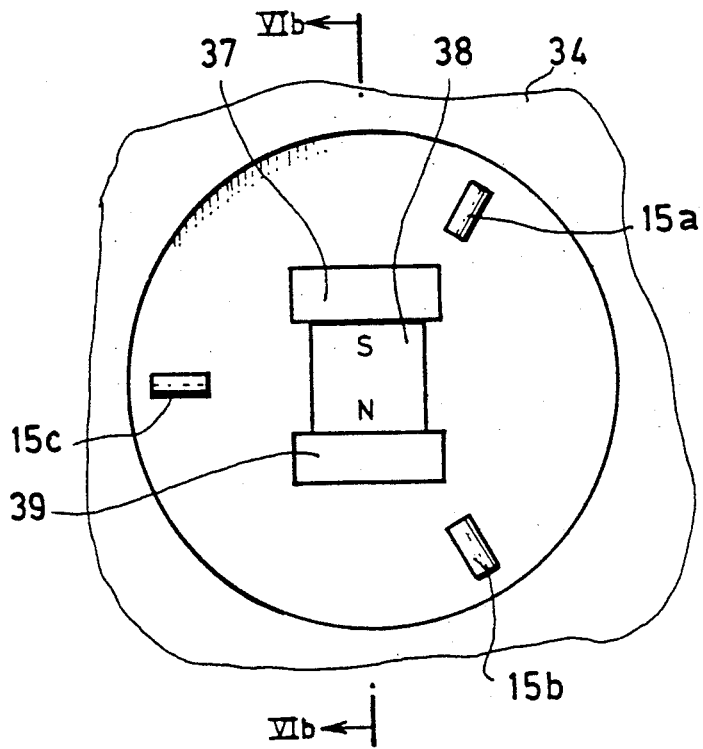
Figure 6B:
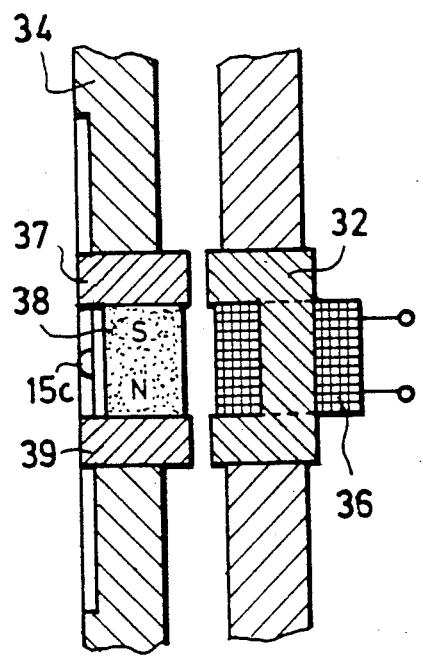

A further embodiment is shown in FIGS. 6a and 6b which departs from the circular symmetry. In this embodiment, the magnet holder in the magazine location 34 is formed by a plate-shaped permanent magnet 38 which is mounted between the legs 37 and 39 of a soft-magnetic yoke with the legs having a rectangular cross section. The legs 37 and 39 together with the iron core 32 of the electromagnet 36 conjointly define a U-shaped flux-conducting part at the exchange position of the magazine with the armature in the exchange plate of the probing device to be exchanged being pulled by the flux-conducting part.

It is understood that the foregoing description is that of the preferred embodiments of the invention and that various changes and modifications may be made thereto without departing from the spirit and scope of the invention as defined in the appended claims.

What is claimed is:

1. A magazine for an apparatus interchangeably utilizing a plurality of task units which are stored in the magazine until transferred into or out of the magazine as needed, each of the task units being adapted to be held by a magnetic force, the magazine comprising:

a member defining a plurality of magazine locations arranged thereon for accommodating corresponding ones of said task units therein for use by the apparatus;

each of said magazine locations including permanent magnetic means having a permanent magnetic field for acting on the task unit stored at said one magazine location with a magnetic holding force for holding the task unit in the magazine location; and, electromagnet means for superposing an electromagnetic field on the permanent magnetic field at the particular magazine location whereat a transfer operation takes place so as to strengthen or weaken the permanent magnetic field depending upon whether the task unit is transferred into or out of said particular magazine location.

2. The magazine of claim 1, said permanent magnetic means comprising a soft-magnetic flux-conducting part defining a longitudinal axis and having a gap formed therein; and, permanent magnet means defining magnetic poles and being mounted in said gap so as to cause said magnetic poles to be aligned in a direction radially of said axis.

3. The magazine of claim 2, said gap being an annular gap; and, said permanent magnet means being a radially polarized ring-shaped permanent magnet seated in said annular gap.

4. The magazine of claim 2, said gap being an annular gap; and, said permanent magnet means including a plurality of axially polarized magnets disposed in said gap so as to be arranged radially of said axis 5. The magazine of claim 2, said flux-conducting part being a U-shaped part having two legs defining said gap therebetween; and, said permanent magnet means including a plate-shaped single magnet disposed in said gap between said legs.

6. The magazine of claim 1, said permanent magnetic means at each of said magazine locations being mounted in said member so as to be displaceable between two positions; and, said magazine further comprising resilient biasing means for resiliently biasing said permanent magnetic means into one of said two positions.

7. The magazine of claim 1, each of said magazine locations further including a three-point bearing; and, each of said task units including an armature on which said magnetic holding force acts along said axis to hold the task unit against said three-point bearing.

8. The magazine of claim 1, said electromagnet means being fixedly mounted at said exchange position of the magazine.

9. The magazine of claim 1, further comprising: gripper means for engaging and transferring a task unit to or away from one of said magazine locations; and, translation means for moving said gripper means and said electromagnetic means between a first stop located at said exchange position and a second stop disposed at a location clear of the magazine.

10. The magazine of claim 1, said apparatus being a coordinate measuring apparatus and said plurality of task units being a plurality of measuring probes.

11. The magazine of claim 1, said apparatus being a machine tool and said plurality of task units being a plurality of work tools.

* * * * *

UNITED STATES PATENT AND TRADEMARK OFFICE
CERTIFICATE OF CORRECTION

PATENT NO. : 5,028,901

DATED : July 2, 1991

INVENTOR(S) : Eckhard Enderle and Dieter Kaufmann

It is certified that error appears in the above-identified patent and that said Letters Patent is hereby corrected as shown below:

In the title page, under "Other Publications": delete "Ernest" and substitute -- Ernst -- therefor.

In column 2, line 3: delete "o" and substitute -- or -- therefor.

In column 3, line 35: between "further" and "of" insert -- embodiment --.

In column 6, line 33: after "axis" insert -- . --.

Signed and Sealed this

Sixth Day of April, 1993

*Attest:*

STEPHEN G. KUNIN

*Attesting Officer*    *Acting Commissioner of Patents and Trademarks*